(12) United States Patent
Kondo et al.

(10) Patent No.: US 11,656,323 B2
(45) Date of Patent: May 23, 2023

(54) MOLDED ARTICLE FOR VEHICLE

(71) Applicant: HONDA MOTOR CO., LTD., Tokyo (JP)

(72) Inventors: Masuo Kondo, Saitama (JP); Nobuyuki Tsuichihara, Saitama (JP); Sachiko Mizuno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 267 days.

(21) Appl. No.: 17/142,382

(22) Filed: Jan. 6, 2021

(65) Prior Publication Data

US 2021/0223358 A1   Jul. 22, 2021

(30) Foreign Application Priority Data

Jan. 16, 2020   (JP) .............................. JP2020-005120

(51) Int. Cl.
```
G01S 7/03       (2006.01)
G01S 13/931     (2020.01)
H01Q 1/32       (2006.01)
G01S 7/02       (2006.01)
```

(52) U.S. Cl.
CPC .............. *G01S 7/03* (2013.01); *G01S 13/931* (2013.01); *G01S 7/027* (2021.05); *G01S 2013/93275* (2020.01); *H01Q 1/3233* (2013.01)

(58) Field of Classification Search
CPC .. G01S 7/03; G01S 2013/93275; G01S 7/027; G01S 13/931; H01Q 1/3233; H01Q 1/42; B60R 19/023; B60R 19/03
See application file for complete search history.

(56) References Cited

U.S. PATENT DOCUMENTS

| | | | |
|---|---|---|---|
| 8,174,432 B2 | 5/2012 | Kawasaki et al. | |
| 9,812,787 B2 * | 11/2017 | Binzer | H01Q 1/422 |
| 10,012,720 B2 * | 7/2018 | Emanuelsson | G01S 13/931 |
| 10,680,318 B2 * | 6/2020 | Nagata | H01Q 19/06 |
| 2014/0159942 A1 * | 6/2014 | Shi | H01Q 1/42 |
| | | | 342/55 |
| 2016/0023624 A1 * | 1/2016 | Schaaf | B60R 19/03 |
| | | | 427/8 |

FOREIGN PATENT DOCUMENTS

| | | | | |
|---|---|---|---|---|
| CN | 107650844 A | | 2/2018 | |
| EP | 2966725 A1 * | | 1/2016 | ........... H01Q 1/3233 |
| JP | 2010101643 A | | 5/2010 | |

OTHER PUBLICATIONS

Relative permittivity—Wikipedia.pdf from https://web.archive.org/web/20190922103527/http://en.wikipedia.org/wiki/Relative_permittivity (Year: 2019).*
EP_2966725_A1_I_translate.pdf—translate of EP_2966725_A1_I (Year: 2016).*
First Examination Report for Chinese Patent Application No. 2021100366840 dated Mar. 31, 2023; 9 pp.

* cited by examiner

*Primary Examiner* — Vladimir Magloire
*Assistant Examiner* — Yonghong Li
(74) *Attorney, Agent, or Firm* — Armstrong Teasdale LLP

(57) ABSTRACT

Provided is a molded article (1) of a vehicle (S) designed to be placed in a path of millimeter wave transmitted from a radar device (7) that can minimize the attenuation of the millimeter wave. The molded product has a thickness as measured in a direction of the path of the millimeter wave transmitted from the radar device which is an integer multiple of a half wavelength of the millimeter wave in the molded article.

4 Claims, 4 Drawing Sheets

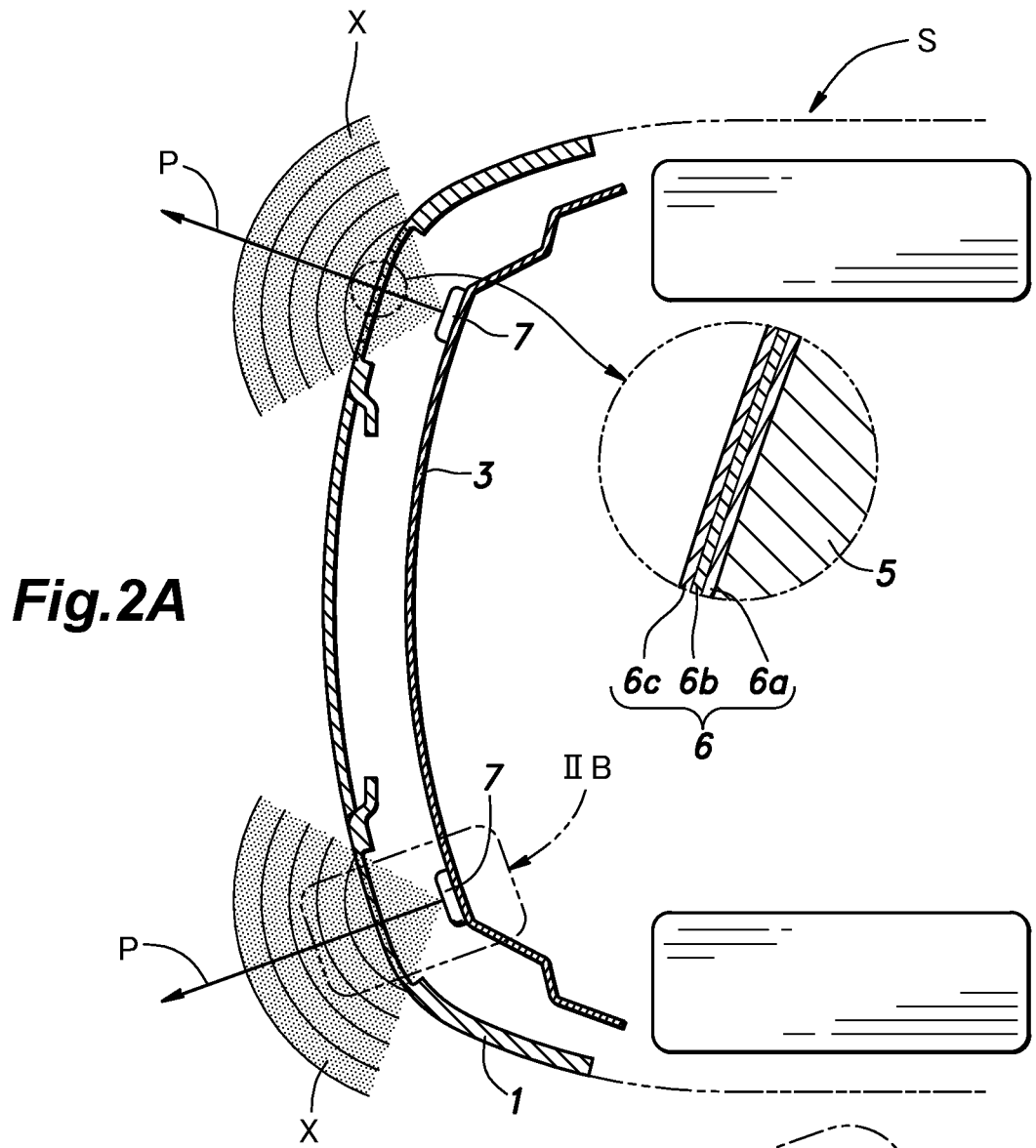
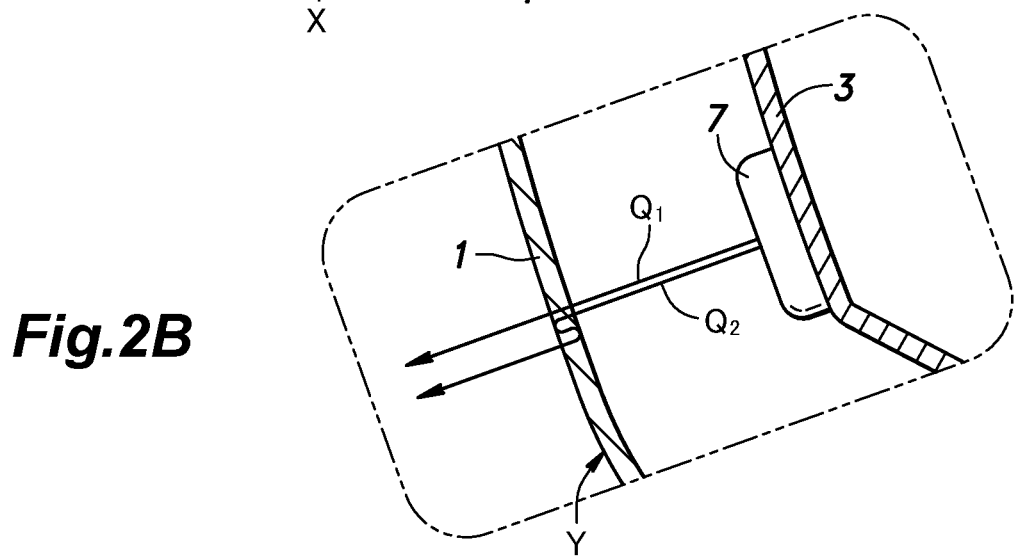

MOLDED ARTICLE FOR VEHICLE

TECHNICAL FIELD

The present invention relates to a molded article for a vehicle having a favorable millimeter wave transmissivity.

BACKGROUND ART

Modern vehicles are often fitted with a radar device which irradiates a millimeter wave to objects (obstacles) surrounding the vehicle, and detects the objects by receiving the millimeter wave reflected by the objects (see JP2010-101643A, for instance). The radar device is typically placed on the back side (reverse side) of a bumper (a molded article) of the vehicle.

The millimeter wave transmitted from the radar device is attenuated when passing through the bumper. If the attenuation of the millimeter wave is excessive, the intensity of the millimeter wave irradiated onto the objects located around the vehicle may be attenuated to such an extent that an accurate detection of the objects may become impossible.

BRIEF SUMMARY OF THE INVENTION

In view of such a problem of the prior art, a primary object of the present invention is to provide a molded article of a vehicle designed to be placed in a path of millimeter wave transmitted from a radar device that can minimize the attenuation of the millimeter wave.

To achieve such an object, the present invention provides a molded article (1) for a vehicle (S) to be placed in a path of millimeter wave transmitted from a radar device (7) mounted on the vehicle, wherein the molded product has a thickness as measured in a direction of the path of the millimeter wave transmitted from the radar device which is an integer multiple of a half wavelength of the millimeter wave in the molded article.

By selecting the thickness of the molded article for a vehicle in this manner, the millimeter wave reflected by the boundary between the molded article and the surrounding air is prevented from canceling the millimeter wave transmitted through the molded article so that the millimeter wave transmitted from the radar device is allowed to be irradiated onto an external object with a minimum attenuation.

Preferably, the thickness of the molded article is smaller in an area (Y) thereof through which the millimeter wave is transmitted than in a remaining part of the molded article.

Thereby, an adequate stiffness of the molded article can be ensured even when the thickness of the molded article in the area (Y) through which the millimeter wave is transmitted is relatively small.

Preferably, the thickness of the molded article is substantially uniform in the area (Y) through which the millimeter wave is transmitted.

Thereby, the millimeter wave can be transmitted with a uniform strength over the entire area.

Preferably, the molded article comprises a base member (5) made of polypropylene, and a coating film (6) formed on a surface of the base member, wherein the thickness of the molded article in the area through which the millimeter wave is transmitted is between 1.8 mm and 2.2 mm, or between 3.1 mm or 3.5 mm, and the thickness of the coating film is 25 μm or less, a combined relative permittivity of the base member and the coating film being about 2.93.

Thereby, the transmissivity of the molded article can be ensured to be an appropriate level, typically better than −3 dB, so that the millimeter wave radar can detect obstacles located around the vehicle in a reliable manner.

Preferably, the thickness of the molded article in the area (Y) through which the millimeter wave is transmitted is smaller than that in at least a large part of a remaining part of the molded article.

Thereby, a favorable transmissivity of the millimeter wave can be ensured without unduly reducing the stiffness of the molded article.

The present invention thus provides a molded article for a vehicle designed to be placed in a path of millimeter wave transmitted from a radar device that can minimize the attenuation of the millimeter wave.

BRIEF DESCRIPTION OF THE DRAWINGS

FIG. 2A is a sectional view taken along line IIA-IIA of FIG. 1;

FIG. 2B is an enlarged view of a part of FIG. 2A indicated by arrow IIB;

DETAILED DESCRIPTION OF THE PREFERRED EMBODIMENT(S)

A rear bumper according to a first embodiment of the present invention is described in the following with reference to the appended drawings.

Figure 1:
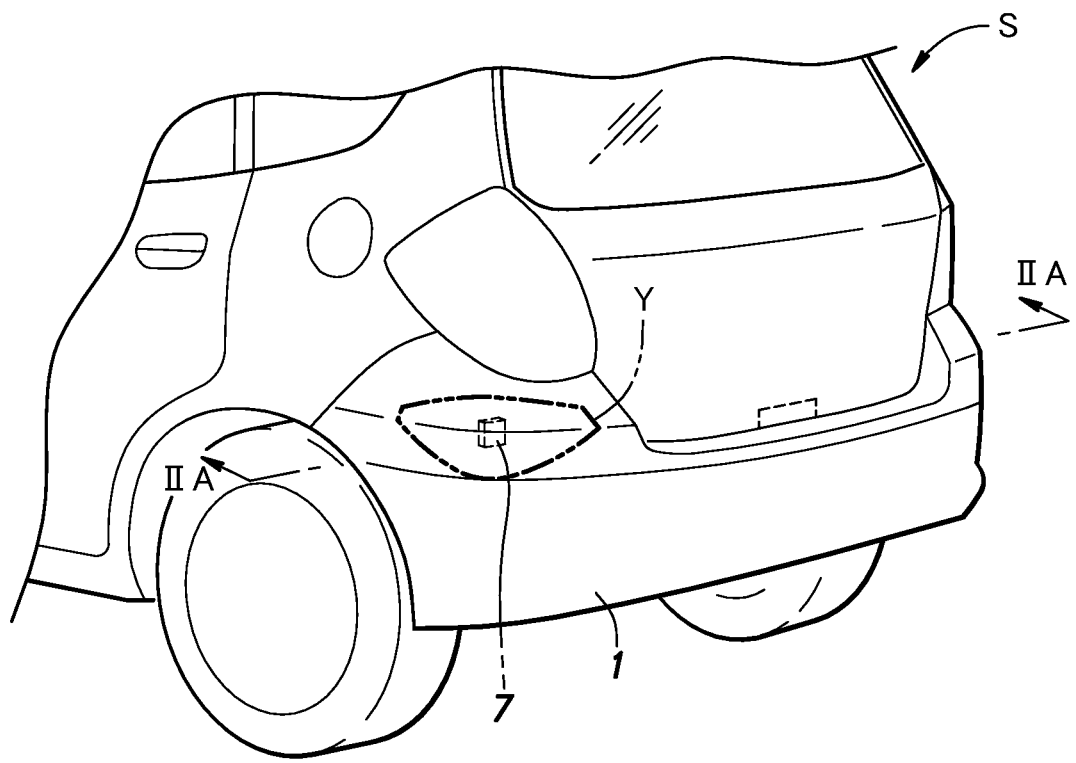
FIG. 1 is a perspective rear view of a vehicle fitted with a molded article consisting of a rear bumper according to a first embodiment of the present invention.

As shown in FIGS. 1, 2A and 2B, a rear bumper 1 (a bumper face) is supported by a structural member (bumper beam 3) in a rear end part of a vehicle S. In the present embodiment, as shown in FIG. 2A, a pair of side members extend along either side of the vehicle body, and the bumper beam 3 is attached to the rear ends of the side members in a per se known manner. The rear bumper 1 is attached to the rear side of the bumper beam 3. The bumper beam 3 is curved so as to face the convex side thereof rearward. The rear bumper 1 is similarly curved so as to conform to the shape of the bumper beam 3.

The rear bumper 1 covers the rear side of the bumper beam 3 so as to provide the functions of absorbing the impact on the rear end of the vehicle, and enhancing the aesthetic appearance of the vehicle.

The rear bumper 1 includes a base member 5 formed of a plastic material such as polypropylene, ABS resin, and PC resin, and a coating film 6 formed on the outer surface (the rear surface) of the base member 5. The coating film 6 is formed by applying a metallic coating to the surface of the base member 5. In the present embodiment, the coating film 6 includes a primer layer 6a applied to the surface of the base member 5, a base coat layer 6b formed on the surface of the primer layer 6a, and a clear coat layer 6c formed on the surface of the base coat layer 6b. The base coat layer 6b may include a plurality of layers for adjusting hue, lightness, saturation, and the like. Further, the base coat layer 6b may include a layer containing metal powder, mica, or the like for producing a metallic appearance. Further, the rear bumper 1 can be colored according to the user's preference. In the present embodiment, the coating film 6 has a certain thickness which may be between 10 µm and 25 µm. If the thickness of the coating film 6 is excessive, this may impair of the transmissivity of the rear bumper 1 for millimeter wave.

As shown in FIG. 2A, a plurality of radar devices 7 are provided on the front side (reverse side) of the rear bumper 1. Each radar device 7 may be directly fixed to the rear surface of the bumper beam 3, or may be fixed to the rear surface of the bumper beam 3 via a bracket. In the present embodiment, a pair of radar devices 7 are fixed to either lateral end part of the bumper beam 3 each via a bracket.

Each radar device 7 is configured to detect objects (obstacles) that may be located around the vehicle S. More specifically, the radar device 7 consists of a millimeter wave radar that transmits a millimeter wave from the vehicle to the environment surrounding the vehicle, and detects the millimeter wave reflected by external objects. The frequency of the millimeter wave that is transmitted is typically in a 76 GHz band.

The radar device 7 is provided with a transmitting antenna and a receiving antenna. The transmitting antenna is supported by the vehicle body so that the beam axis P thereof faces in an oblique direction or in a laterally outer and rearward direction over a certain angular range as indicated by the shaded region X in FIG. 2A. In the present embodiment, the angular range of the transmitted millimeter wave is defined as a conical region centered around the beam axis P of the transmitting antenna, and having a certain cone half angle. The transmitted millimeter wave passes through the rear bumper 1, and is irradiated in the laterally outer and rearward direction. Thus, the rear bumper 1 includes a part (transmission area Y) located in the path of the irradiated millimeter wave.

The receiving antenna detects the millimeter wave reflected by an obstacle located behind the vehicle S. However, in order for the reflected wave to be detected by the receiving antenna, the transmissivity T (dB) of the millimeter wave that is transmitted from the radar device 7, and passes through the rear bumper 1 is required to be equal to or greater than a predetermined threshold value (−3 dB).

The transmissivity T referred to here is represented by Equation (1) given in the following:

$$T = \log_{10}\left(\frac{P_{out}}{P_{in}}\right) \quad (1)$$

where Pin (W) is the power of the incident millimeter wave, and Pout (W) is the power of the millimeter wave that has passed through the rear bumper 1.

In Equation (1), $\log_{in}$ represents the common logarithmic function with the base of 10.

In FIG. 1, the area of the rear bumper 1 through which the millimeter wave is transmitted is indicated as the area (transmission area Y) surrounded by a two-dot chain line. This transmission area Y corresponds to the area over which the millimeter wave transmitted from the radar device 7 passes through. As shown in FIG. 2A, the thickness of the rear bumper 1 in the transmission area Y is substantially constant, and smaller than the thickness of a large part of the remaining part or the substantially entire remaining part of the rear bumper 1 which in this case is also substantially constant.

The thickness of the transmission area Y of the rear bumper 1 is selected to correspond to the wavelength of the millimeter wave in the material of the rear bumper 1 as the millimeter wave passes through the rear bumper 1. More specifically, the thickness of at least a part of the transmission area Y of the rear bumper 1 (in particular an area surrounding the beam axis P) is substantially equal to an integer multiple of the half wavelength of the millimeter wave in the material of the rear bumper 1. As well known in the art, the wavelength of radio wave (λ) in a medium having a relative permittivity of $\varepsilon_r$ is given by Equation (2) given in the following:

$$\lambda = \lambda_0/\varepsilon_r^{1/2} \quad (2)$$

where $\lambda_0$ is the wavelength of millimeter wave in vacuum. In the present embodiment, the thickness of the portion of the rear bumper 1 along the beam axis P is within ±30% of an integer multiple of the half wavelength of the millimeter wave (or between 0.7 times and 1.3 times of an integer multiple of the half wavelength of the millimeter wave) in the rear bumper 1.

In the present embodiment, the frequency of the millimeter wave emitted from the radar device 7 is in the 76 GHz band, the resin material forming the base member 5 of the rear bumper 1 is polypropylene (having a relative permittivity of 2.54), and the thickness of the base member 5 in the transmission area Y is between 1.8 mm and 2.2 mm. (The thickness values given in this disclosure should be understood as geometrical distances as actually measured.) The thickness of the coating film 6 is between 10 µm and 25 µm. The thickness of the coating film 6 is defined as the sum of the thicknesses of a primer layer 6a, a base coat layer 6b, and a clear coat layer 6c. The relative permittivity of the coating film 6 is given as a composite value of the relative permittivities of the primer layer 6a, the base coat layer 6b, and the clear coat layer 6c. Since the thickness of the coating film 6 is so small as compared to the thickness of the base member 5, it is also possible to disregard the presence of the coating film 6 altogether.

In the present embodiment, the relative permittivity of the base member 5 is 2.54, and the thickness of the base member 5 is between 1.8 mm and 2.2 mm, and the thickness of the coating film 6 is between 10 µm and 25 µm. Further, the material of the coating film 6 is selected so that the relative permittivity of the rear bumper 1 (the base member 5+the coating film 6) is between 2.54 and 2.93. As a result, the thickness of the rear bumper 1 including the base member 5 and the coating film 6 in the millimeter wave transmission area Y is between 0.7 times and 1.3 times of an integer multiple of the half wavelength of the millimeter wave in the rear bumper 1 and transmitted through the rear bumper 1.

The thickness of the base member 5 other than the transmission area Y is generally between 1.2 mm and 4.0 mm, and is more preferably between 2.5 mm and 3.0 mm so that the rear bumper 1 has a sufficient rigidity but can be resiliently deformed to a certain extent by a rear collision load. Thus, the thickness of the rear bumper 1 other than the transmission area Y is generally between 2.5 mm and 3.0 mm, and the thickness of the rear bumper 1 in the transmission area Y is generally between 1.8 mm and 2.2 mm. Thus, the thickness of the rear bumper 1 in the millimeter wave transmission area Y is generally uniform, and the thickness of the rear bumper 1 in the millimeter wave transmission area Y is generally less than that of the remaining part of the rear bumper 1.

Next, the various features and advantages of the rear bumper 1 (the molded article for vehicles) according to the present embodiment are discussed in the following. Since a part of the millimeter wave emitted from the radar device 7 is reflected by the front surface and the back surface of the rear bumper 1, transmission loss inevitably occurs. As the transmission loss increases and the transmissivity T is attenuated more, the intensity of the millimeter wave irradiated to the outside of the vehicle decreases. As a result, the intensity of the millimeter wave reflected by the obstacles located around the vehicle S is reduced in the corresponding manner so that the detection of the obstacle may not be properly performed.

Figure 3:
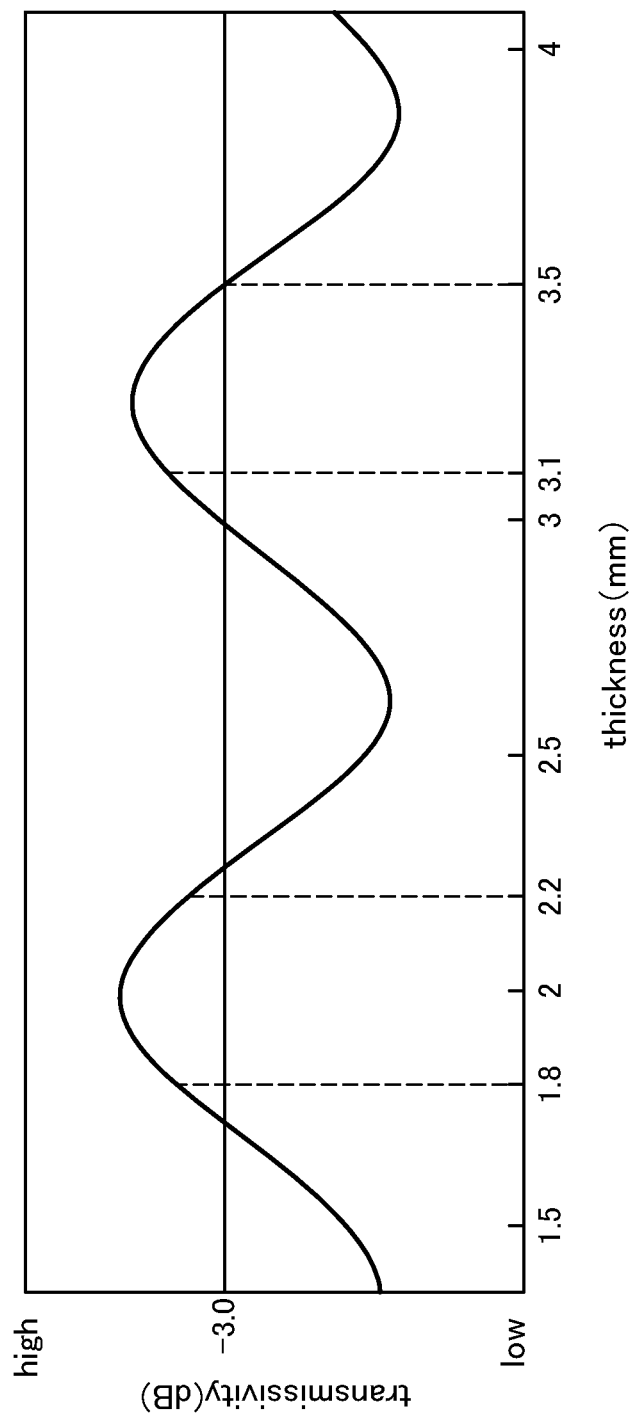
FIG. 3 is a graph showing the dependency of the transmissivity of millimeter wave transmitted through a plate member made of polypropylene on the thickness thereof.

FIG. 3 shows the dependency of the transmissivity T (dB) of a sample on the thickness (mm) of the main member 5 consisting of a polypropylene plate with respect to 76 GHz millimeter wave. The sample was prepared by applying a coating film 6 having a relative permittivity of 2.54 and a thickness of 25 μm on the surface of the main member 5. The thickness of the coating film 6 was 25 μm, and this is so small as compared with the thickness of the base member 5 that the horizontal axis (thickness) in FIG. 3 is substantially equal to the thickness of the base member 5. The curve shown in FIG. 3 was obtained by measuring the transmissivity T of each of a plurality of plate samples having a thickness difference of 0.25 mm from one sample to another, and plotting an approximate line based on the measured values. Further, the relative permittivity of the base member 5 was 2.93.

As shown in FIG. 3, the frequency of the millimeter wave emitted from the radar device 7 was 76 GHz, the base member 5 was made of polypropylene, and the thickness of the base member 5 of the rear bumper 1 along the beam axis P was between 1.8 mm and 2.2 mm, and the thickness of the coating film 6 was 25 μm. Under this condition, the thickness of the rear bumper 1 along the beam axis P was about twice the half wavelength of the millimeter wave transmitted through the rear bumper 1.

The effective relative permittivity of the rear bumper 1 combining the base member 5 and the coating film 6 was about 2.93, but this figure is based on an approximation, and may contain a certain amount of error. Thus, the half wavelength in the rear bumper 1 was approximately 1.0 mm (or the wavelength in the rear bumper 1 was approximately 2.0 mm). As shown in FIG. 2B, the path (the first path Q1) of the millimeter wave directly transmitted through the rear bumper 1 joins with the path (the second path Q2) of the millimeter wave reflected by the outer interface of the rear bumper 1 and the inner interface of the rear bumper 1. When the difference between the distances of the two paths (Q1 and Q2) is an integer multiple of the wavelength of the millimeter wave, the millimeter wave that has passed through the first path Q1 and the millimeter wave that has passed through the second path Q2 mutually strengthen each other. (Otherwise, the millimeter wave that has passed through the first path Q1 and the millimeter wave that has passed through the second path Q2 tend to mutually cancel each other.) As a result, the transmissivity T increases, and achieves a level of −3 dB or more. Therefore, the detection of the reflected wave by the receiving antenna can be improved, and the radar device 7 can detect obstacles or the like located around the vehicle S with an improved performance.

As shown in FIG. 3, when the thickness of the base member 5 of the rear bumper 1 along the beam axis P is 1.8 mm, the thickness of the rear bumper 1 along the beam axis P is 0.9 times the wavelength of the millimeter wave. When the thickness of the base member 5 of the rear bumper 1 along the beam axis P is 2.2 mm, the thickness of the rear bumper 1 along the beam axis P is 1.1 times the wavelength of the millimeter wave in the material of the rear bumper 1. Thus, the thickness of the rear bumper 1 along the beam axis P is within the range of ±10% of the wavelength (twice the half wavelength). This can be generalized that the transmissivity T (dB) of the millimeter wave can be improved or may be ensured to be −3 dB or more by setting the thickness of the rear bumper 1 within the range of ±10% or less or an integer multiple of the half wavelength of the millimeter wave.

In the present embodiment, since the thickness of the rear bumper 1 is between 1.8 mm and 2.2 mm in the transmission area Y, and between 2.5 mm and 3.0 mm in at least most of the remaining part, an adequate stiffness can be ensured to the rear bumper 1 (as compared with the case where the thickness of the rear bumper 1 is between 1.8 mm and 2.2 mm in most part of the rear bumper 1), and a transmissivity T better than −3 dB can be ensured. As a result, sufficient load absorption can be performed by the deformation of the rear bumper 1 at the time of a light rear collision.

In the present embodiment, the thickness of the rear bumper 1 is substantially constant over the entire irradiation range of the millimeter wave radar. This simplifies the configuration of the rear bumper 1 and facilitates the design and manufacture of the rear bumper 1 (in particular, the base member 5 thereof).

The present invention has been described in terms of a specific embodiment, but is not limited by such an embodiment, and can be modified in various ways without departing from the scope of the present invention.

As shown in FIG. 3, the thickness of the base member 5 is not limited to the range of 1.8 mm to 2.2 mm, but may also be between 3.1 mm and 3.5 mm. In another embodiment based on such a consideration, the base member 5 is made of polypropylene having a relative permittivity of 2.54, and the thickness of the base member 5 in the transmission area Y is between 3.1 mm and 3.5 mm. The coating film 6 in the transmission area Y has a thickness of 10 μm to 25 μm. The relative permittivity of the rear bumper 1 is in the range of 2.54 to 2.93. Thus, the thickness of the rear bumper 1 is within ±10% of three times the half wavelength of the millimeter wave, and the transmissivity T (dB) of the millimeter wave that passes through the rear bumper can be −3 dB or better.

In the foregoing embodiment, the thickness of the base member 5 was constant in the millimeter wave transmission area Y, but the present invention is not limited to this embodiment. A plurality of regions having different thicknesses may be provided in the millimeter wave transmission area Y of the vehicle molded article. For instance, a first region of the transmission area Y has a thickness equal to a first integer times the half wavelength of the millimeter wave, and a second region of the transmission area Y has a thickness equal to a second integer times the half wavelength of the millimeter wave, the second integer being greater in value than the first integer. Preferably, the first region corresponds to a part of the transmission area Y immediately around the beam axis P, and the second region corresponds to a part of the transmission area Y surrounding the first regions. Thereby, the transmission performance of the molded product can be maximized while ensuring an adequate stiffness to the molded article owing to the judicious distribution of the thickness of the molded article. Further, when the vehicle molded article is provided with a plurality of separate millimeter wave transmission areas, the transmission areas may have different thicknesses so as to correspond to the different stiffness requirements and/or different transmission efficiency requirements.

Figure 4A:
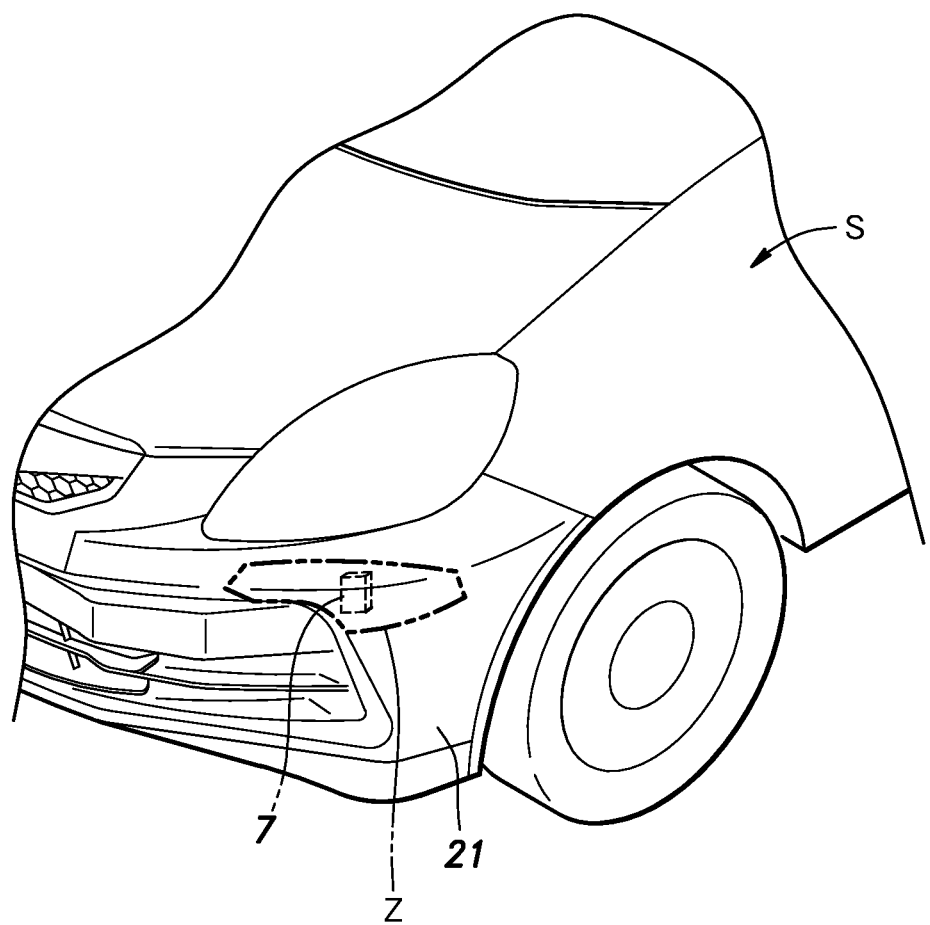
FIG. 4A is a perspective front view of a vehicle fitted with a molded article consisting of a front bumper according to a second embodiment of the present invention.
Figure 4B:
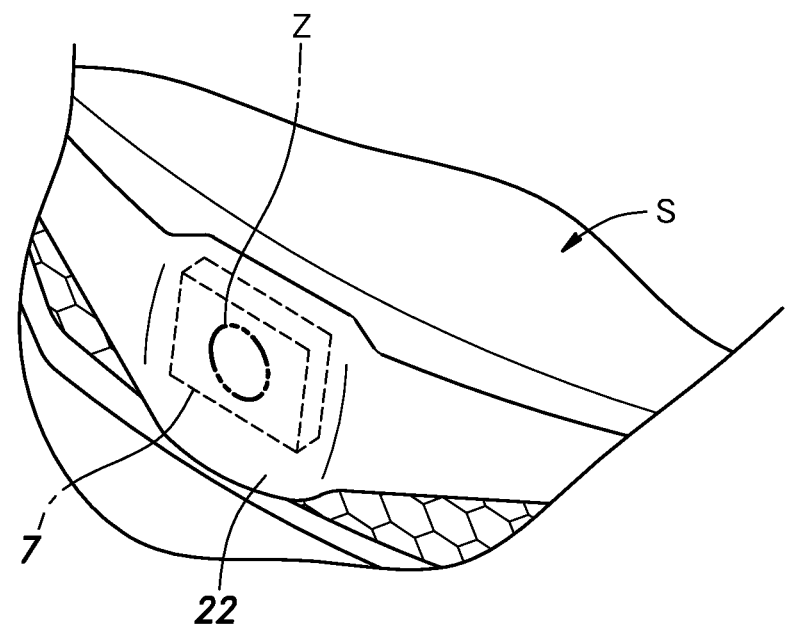
FIG. 4B is a perspective front view of a vehicle fitted with a molded article consisting of a front emblem according to a third embodiment of the present invention.

The molded article for a vehicle was a rear bumper 1 in the foregoing embodiment, but the molded article may also be applied to other molded articles for a vehicle. For example, the molded article for a vehicle may be a front bumper 21 as shown in FIG. 4A, or a front emblem 22 (decorative part) provided on the surface of the front grille as shown in FIG. 4B. In these cases also, the molded articles are configured such that the millimeter wave transmissivity T is maximized in a region surrounding the beam axis (transmission areas Z indicated by double-dot chain-dot lines). More specifically, as in the first embodiment, the effective thickness of the members constituting the front bumper 21 and the front emblem 22 in the transmission area Z is selected so as to correspond to a multiple integer of the half wavelength of the millimeter wave so that the transmissivity of the millimeter wave passing through the transmission area Z may be maximized.

In the foregoing embodiments, the thickness of the molded article (the base member 5) in the area other than the transmission area Y was greater than that in the transmission area Y (such as between 2.5 mm and 3.0 mm) as compared with that in the transmission area Y (such as between 1.8 mm and 2.2 mm). However, if an adequate stiffness in ensured, the molded article may have a thickness that optimizes the transmissivity substantially over the entire part thereof. Also, the part other than the transmission area Y is not required to have a large thickness (such as between 2.5 mm and 3.0 mm) over the entire area thereof, but it suffices if the part other than the transmission area Y has a large thickness only in parts which are essential for ensuring an adequate stiffness.

The effective thickness of the transmission area Y of the rear bumper 1 is selected to correspond to the wavelength of the millimeter wave in vacuum (or in the atmosphere) that passes through the rear bumper 1.

The invention claimed is:

1. A molded article for a vehicle to be placed in a path of a millimeter wave transmitted from a radar device mounted on the vehicle, wherein the molded article has a thickness as measured in a direction of the path of the millimeter wave transmitted from the radar device that is an integer multiple of a half wavelength of the millimeter wave in a molded article medium,
    wherein the molded article comprises a base member made of polypropylene, and a coating film formed on a surface of the base member,
    wherein a thickness of the base member in an area through which the millimeter wave is transmitted is between 1.8 mm and 2.2 mm, or between 3.1 mm and 3.5 mm,
    wherein the coating film is composed of a plurality of layers, and a sum of thicknesses of the plurality of layers is 25 μm or less,
    wherein a combined relative permittivity of the base member and the coating film is about 2.93.

2. The molded article for the vehicle according to claim 1, wherein the thickness of the molded article is smaller in an area thereof through which the millimeter wave is transmitted than in a remaining part of the molded article.

3. The molded article for the vehicle according to claim 2, wherein the thickness of the molded article is substantially uniform in the area thereof through which the millimeter wave is transmitted.

4. The molded article for the vehicle according to claim 1, wherein the thickness of the molded article in an area thereof through which the millimeter wave is transmitted is smaller than that in at least a large part of a remaining part of the molded article.

\* \* \* \* \*